United States Patent
Schneider (10) Patent No.: US 11,840,871 B2
(45) Date of Patent: Dec. 12, 2023

(54) CLOSING AID IN A LOCKING MECHANISM OF A LUGGAGE COMPARTMENT FLAP, LUGGAGE COMPARTMENT, AND VEHICLE WITH CLOSING AID

(71) Applicant: Airbus Operations GmbH, Hamburg (DE)

(72) Inventor: Uwe Schneider, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 457 days.

(21) Appl. No.: 17/209,321

(22) Filed: Mar. 23, 2021

(65) Prior Publication Data
US 2021/0301568 A1   Sep. 30, 2021

(30) Foreign Application Priority Data
Mar. 25, 2020   (DE) .......................... 102020108183.9

(51) Int. Cl.
| | | |
|---|---|---|
| B60R 5/00 | (2006.01) | |
| B64D 11/00 | (2006.01) | |
| E05C 3/16 | (2006.01) | |
| E05F 3/04 | (2006.01) | |
| E05C 3/00 | (2006.01) | |

(52) U.S. Cl.
CPC ............... *E05C 3/16* (2013.01); *B60R 5/003* (2013.01); *E05C 3/008* (2013.01); *E05F 3/04* (2013.01); *B64D 11/003* (2013.01); *E05Y 2201/21* (2013.01); *E05Y 2201/654* (2013.01); *E05Y 2900/502* (2013.01); *E05Y 2900/54* (2013.01)

(58) Field of Classification Search
CPC ... E05C 3/16; E05C 3/008; E05F 3/04; E05Y 2201/654; E05Y 2900/502; E05Y 2900/54; B60R 5/00; B60R 5/003; B64D 11/003; B64D 11/0635; B64D 11/0627; B61D 37/003
See application file for complete search history.

(56) References Cited

U.S. PATENT DOCUMENTS 5,244,269 A * 9/1993 Harriehausen ........ E05F 1/1091
                                                     312/319.1
5,988,565 A   11/1999 Thomas et al.
(Continued)

FOREIGN PATENT DOCUMENTS

DE   102004048052 A1   4/2006

OTHER PUBLICATIONS

German Search Report; priority document.

*Primary Examiner* — Gregory A Blankenship
(74) *Attorney, Agent, or Firm* — Greer, Burns & Crain, Ltd.

(57) ABSTRACT

A closing aid for a luggage compartment flap is described, which closing aid comprises an actuating element, a movement element and a connecting element. The actuating element is integrated in a locking mechanism of the luggage compartment flap. The connecting element connects the actuating element to the movement element and transmits a movement of the actuating element to the movement element such that the luggage compartment flap fastened to the movement element is moved at least part of the way from an open position to a closed position. A luggage compartment and a vehicle having a closing aid of this type are also described.

11 Claims, 3 Drawing Sheets

(56) References Cited

U.S. PATENT DOCUMENTS

| | | | |
|---|---|---|---|
| 6,290,175 B1* | 9/2001 | Hart | B64D 11/003 |
| | | | 244/118.1 |
| 2004/0245897 A1* | 12/2004 | Stephan | B61D 37/003 |
| | | | 312/246 |
| 2014/0283336 A1* | 9/2014 | Cloud | B64D 11/003 |
| | | | 16/72 |
| 2018/0258673 A1* | 9/2018 | Schoerkhuber | E05C 17/50 |
| 2018/0319501 A1* | 11/2018 | Schörkhuber | E05F 3/22 |
| 2019/0092473 A1* | 3/2019 | Benthien | B60R 5/003 |
| 2019/0263525 A1* | 8/2019 | Cloud | B64D 11/003 |
| 2020/0269983 A1* | 8/2020 | Berkenhoff | B64D 11/003 |
| 2020/0340274 A1* | 10/2020 | Di Carlo | B64D 11/003 |
| 2020/0370330 A1* | 11/2020 | Valdes | E05C 19/12 |
| 2021/0040786 A1* | 2/2021 | Heimbach | E05D 3/02 |
| 2021/0300251 A1* | 9/2021 | Wuggetzer | B64D 11/003 |
| 2021/0301568 A1* | 9/2021 | Schneider | E05C 3/008 |
| 2022/0153419 A1* | 5/2022 | Gross | B64D 11/003 |
| 2022/0274708 A1* | 9/2022 | Rheaume | B64D 11/003 |
| 2023/0226534 A1* | 7/2023 | Born | B01J 35/0006 |
| | | | 423/403 |

* cited by examiner

CLOSING AID IN A LOCKING MECHANISM OF A LUGGAGE COMPARTMENT FLAP, LUGGAGE COMPARTMENT, AND VEHICLE WITH CLOSING AID

CROSS-REFERENCES TO RELATED APPLICATIONS

This application claims the benefit of the German patent application No. 102020108183.9 filed on Mar. 25, 2020, the entire disclosures of which are incorporated herein by way of reference.

FIELD OF THE INVENTION

The present invention relates to a closing aid for a luggage compartment flap in a locking mechanism of the luggage compartment flap, and to a luggage compartment and to a vehicle having a closing aid of this type. In particular, the present invention relates to a closing aid for a luggage compartment flap, wherein an actuating element of the closing aid is integrated in a locking mechanism of the luggage compartment flap, and to an associated luggage compartment and to a vehicle having a closing aid of this type.

BACKGROUND OF THE INVENTION

In aircraft and some other means of mass transportation, such as, for example, ships, buses or trains, overhead luggage compartments are arranged in the region of the ceiling. The luggage compartments, which are normally provided above passenger seats, are open towards an aisle running adjacent to the seats and are closed by means of a flap. In the opened state of the flap, the free end thereof is situated in the ceiling region of the passenger cabin and thus high above the aisle.

Depending on the construction of the vehicle and/or the height of the passenger or of the member of service personnel, it can be difficult to reach the free end in order to close the flap. Therefore, in order to reach and close the luggage compartment flap, the person in question often climbs onto a step provided on a passenger seat, or even climbs fully onto the seat, in order to be able to grip the flap. This not only presents risks to the person in question, but also requires a correspondingly stable construction of the seat, whereby this is made heavier.

SUMMARY OF THE INVENTION

The invention is therefore based on an object of allowing easier closing of a luggage compartment flap and of providing a corresponding luggage compartment and an associated vehicle, which facilitate closing of the luggage compartment flap.

According to a first aspect, for improved understanding of the present disclosure, a closing aid for a luggage compartment flap of a luggage compartment comprises an actuating element which is configured to be moved from an initial position into an activation position, a movement element which is configured to be fastened to the luggage compartment flap, and a connecting element which connects the actuating element to the movement element and which transmits a movement of the actuating element to the movement element. In other words, the closing aid comprises spatially spaced-apart means for moving the luggage compartment flap.

The luggage compartment flap can be moved at least part of the way from an open position to a closed position as a result of the movement of the movement element. The luggage compartment flap is pivotable relative to a static section of the luggage compartment. For example, a mounting arm may be articulated at an articulation point so as to be rotatable relative to the luggage compartment and may comprise a first section, with a first end which is configured for the mounting of the luggage compartment flap thereon, and a second section. The mounting arm serves for the fastening of the luggage compartment flap and for the movement of the luggage compartment flap, for example from the closed position to the open position and vice versa. Here, the articulation point may be provided on a side wall of the associated luggage compartment. For example, a hinge or some other joint may be provided on the side wall for the rotatable fastening of the mounting arm. Alternatively or in addition, the articulation point may also be provided on a structure which is independent of the luggage compartment. For example, a hinge or some other joint may be provided on a primary structure of the vehicle, on an installation rail or on a similar holding means for the rotatable fastening of the mounting arm.

The fastening of the movement element to the luggage compartment flap is to be understood here to mean a direct connection and an indirect connection. A direct connection exists if the movement element is fastened to a section of the luggage compartment flap. An indirect connection may be realized, for example, by virtue of the movement element being fastened to one section of the mounting arm (for example the second section). It is self-evidently possible for further intermediate elements to be arranged between the movement element and the luggage compartment flap and to connect the movement element and the luggage compartment flap with mechanical action.

Furthermore, the actuating element may be integrated in a locking mechanism of the luggage compartment flap. This integration of the actuating element in the locking mechanism allows a compact design of the closing aid and furthermore a relatively concealed arrangement of the actuating element. Furthermore, no additional actuating element is required outside or within the luggage compartment, which would otherwise take up space between luggage compartments, above or below the luggage compartment and/or within the luggage compartment. The closing aid is thus of visually more appealing design and is less susceptible to damage, in particular during the loading and unloading of items of luggage into and from the luggage compartment.

A luggage compartment flap is normally pivoted upwards when it is moved into its open position. In particular, a free end, situated opposite the articulation point and mounting arm, of the luggage compartment flap is moved upwards in the process. The movement element can then move the luggage compartment flap from its open position in the direction of a closed position. The movement element and its coupling to the luggage compartment flap or to the mounting arm serves, in particular, only for the movement of the luggage compartment flap from the open position, in which the luggage compartment flap is more difficult to reach owing to its high position, in the direction of the closed position, such that the luggage compartment flap is easier to reach. Complete closure of the luggage compartment flap is then possible manually, as is also the case with known luggage compartment flaps. In particular, owing to the arrangement of the actuating element in the region of a closure device (in the form of the locking mechanism) of the luggage compartment flap, the luggage compartment flap can be easily closed manually. For example, a person can operate the actuating element using one hand, whereby the luggage compartment flap arranged above the person moves from its open position in the direction of the closed position and thus towards the person. Then, using the other hand, the person can easily grip the free end of the luggage compartment flap and manually close the latter.

In particular, in the case of large luggage compartments with a large luggage compartment flap, which in its open position is arranged almost at the ceiling of a vehicle cabin, the movement caused by the closing aid is helpful in order to facilitate the closing of the luggage compartment flap. Depending on the height of the luggage compartment flap in its open position (in relation to a vehicle floor or vehicle cabin floor), it is sufficient to move the luggage compartment flap downwards by a few centimeters (approximately 5 to 20 cm) such that it is easier to reach and can be operated by hand. A small rotational movement about the articulation point, for example between 2° and 20°, preferably between 5° and 15°, is sufficient to move the free end of the luggage compartment flap downwards by a few centimeters.

Since no cumbersome closing mechanism is provided for moving the luggage compartment flap all the way into its closed position, the closing aid can be of small and light-weight configuration. Furthermore, a small and lightweight closing aid can also be retrofitted in existing luggage compartments and on existing luggage compartment flaps.

In one implementation variant, the locking mechanism may be arranged in a region of a base of the luggage compartment. This region of the luggage compartment is normally arranged at a height (above the vehicle floor or vehicle cabin floor) that is easy for a standing person of average height to reach. The actuating element of the closing aid is thus also easy to reach, in particular, easier to reach than the luggage compartment flap in its open position.

In one implementation variant, the locking mechanism may be a movable catch on the luggage compartment. Alternatively, the locking mechanism may also be a rotary latch on the luggage compartment. "On the luggage compartment" means that the movable catch is attached to the static part of the luggage compartment and is thus independent of the pivotable luggage compartment flap. For example, the locking mechanism is provided centrally on the luggage compartment base. In order to allow easy accessibility to the locking mechanism when the luggage compartment flap is closed (is situated in its closed position), the locking mechanism is normally arranged at a front edge of the luggage compartment base, which faces towards a passenger aisle.

Furthermore, the catch can be moved in an opening direction from a locking position in which it holds a closing element into a position in which it releases the closing element. The closing element may, for example, be arranged on the luggage compartment flap and, in its locking position, be operatively connected to the catch such that the luggage compartment flap is locked. An operative connection may arise by virtue of a section of the catch engaging around a part of the closing element, such that the closing element is restricted or blocked in terms of its movement. Movement of the catch in the opening direction causes the closing element to be released, and the luggage compartment flap can be opened or can open automatically.

The catch may furthermore be configured to, in a further movement which takes place in the opening direction (that is to say, after the release of the closing element), move the movement element. This dual function of the catch (of a required component of the luggage compartment) makes it possible to omit a separate actuating element for the closing aid.

In a further implementation variant, the locking mechanism may be a closing element on the luggage compartment, which closing element is blocked in a holding direction, in which the closing element firmly holds a catch, and is movable in an opposite direction. The closing element may be arranged, in the form of a rod, of a U-shaped hoop or of a similar component, on the luggage compartment. In this implementation variant, the catch is, for example, arranged on the luggage compartment flap and can be moved between a locking position and an opening position. In the locking position, the catch is in engagement (operative connection) with the closing element, such that the luggage compartment flap is blocked (locked) in its closed position. The holding direction thus lies in the direction of the luggage compartment flap or in an opening direction of the luggage compartment flap, such that the closing element can securely hold the luggage compartment flap. The opposite direction thus points into the luggage compartment or into a section, for example a base, of the luggage compartment. Likewise, merely by way of example, the movement direction of the closing element may also have an angle with respect to the opening direction of the luggage compartment flap, and may, for example, run parallel to the base of the luggage compartment. In this way, the luggage compartment base does not need to be configured to be deeper/thicker than is conventional.

Since the luggage compartment flap or the catch attached thereto cannot be moved in the direction opposite to the holding direction of the closing element (the luggage compartment flap normally lies against static elements of the luggage compartment in the closed position), a movement of the closing element in this opposite direction, in particular when the luggage compartment flap is open, can be utilized for another function. Here, the other function is the actuation of the closing aid (dual function). Here, too, a separate actuating element for the closing aid can be omitted, whereby the closing aid can be of compact configuration.

In a particular implementation variant, the connecting element may be a Bowden cable. A Bowden cable is normally very flexible and can therefore be easily routed in any desired manner between the actuating element and the movement element. The Bowden cable may, for example, run in sections of the luggage compartment (base, side wall, rear wall, etc.). It is thus possible for depressions to be provided in the sections of the luggage compartment; in which depressions the Bowden cable is arranged. Alternatively, it is also possible for tubular cavities to be provided in the sections of the luggage compartment for the purposes of guiding the Bowden cable. In the case of these cavities, it is also possible to omit the fixed sheath of the Bowden cable, such that only the wire cable of the Bowden cable has to be routed in the cavity. Also, a Bowden cable can be easily routed on an inner side or outer side of the luggage compartment, such that the closing aid can be easily retrofitted in existing luggage compartments. In particular, on an outer side of the luggage compartment, there is normally sufficient space to accommodate a (normally very thin and flexible) Bowden cable.

The actuating element serves in any case as a handle for performing a pulling movement of the Bowden cable which is fastened to the actuating element. In particular, a wire of the Bowden cable is fastened to the actuating element. If necessary, a diverting roller may be provided between the actuating element and the Bowden cable in order to convert a movement of the actuating element into a pulling movement of the Bowden cable.

In a further implementation variant, the movement element may be an end, fastened to the luggage compartment flap, of the Bowden cable. It is thus possible for a pulling movement that is introduced into the Bowden cable by means of the actuating element to be transmitted to the luggage compartment flap, such that the luggage compartment flap moves at least part of the way from its open position to a closed position. Here, the end of the Bowden cable may be fastened to the luggage compartment flap itself or to a section of the mounting arm on which the luggage compartment flap is mounted.

Furthermore, the Bowden cable may have a length which allows a movement of the luggage compartment flap from the closed position to the open position before the Bowden cable is tensioned. For example, the end of the Bowden cable (the movement element) may be attached to a section of the luggage compartment flap, or of the mounting arm, which moves towards the Bowden cable during a movement of the luggage compartment flap from its open position into the closed position. Thus, an excess length of the Bowden cable (in particular of the wire of the Bowden cable) leads to a loop or the like. If the luggage compartment flap opens as far as its open position, the Bowden cable is tautened in the region of the loop until it is ultimately tensioned. A tensioned Bowden cable means that a movement of the actuating element (start of the Bowden cable) immediately causes a movement of the movement element (end of the Bowden cable).

In an alternative implementation variant, the connecting element may be a hydraulic line. A hydraulic line may be provided, in particular, in the form of a hose line between actuating element and movement element. Here, the actuating element may comprise a hydraulic piston. If the actuating element is now moved, for example the catch moves in the further movement which takes place in the opening direction or the closing element moves in the direction opposite to the holding direction, the hydraulic piston can be arranged such that the actuating element forces hydraulic fluid by means of the hydraulic piston into the hydraulic line.

Here, the movement element may be a hydraulic actuator. For example, the hydraulic actuator may be a pressure piston which is connected to the hydraulic line. If hydraulic fluid is then forced through the hydraulic line, the pressure piston of the hydraulic actuator moves. Through corresponding connection of the hydraulic actuator to the luggage compartment flap or to a section of the mounting arm, the luggage compartment flap can be moved (forced) at least part of the way from its open position to its closed position.

In one implementation variant, the hydraulic actuator may be a hydraulic damping element which dampens an opening movement of the luggage compartment flap. The hydraulic damping element may, for example, likewise be implemented in the form of a hydraulic piston, wherein the hydraulic piston or cylinder has small openings through which hydraulic fluid can flow from one side of the piston to the other. A damping action can be attained by means of this flow of the hydraulic fluid through the piston or past the piston. However, it is also possible for the piston arranged in the damping element to be moved by a fast inflow of hydraulic fluid from the hydraulic line (connecting element) into the damping element. This movement of the piston is transmitted to the luggage compartment flap (or to the mounting arm), whereby the luggage compartment flap is moved at least part of the way from its open position to its closed position. It is duly possible that, owing to the damping function of the damping element, the luggage compartment flap slowly opens again. It is however possible in the intervening time for the luggage compartment flap to be reached and (manually) closed.

According to a further aspect for improved understanding of the present disclosure, a luggage compartment for a vehicle comprises at least one side wall, a rear wall, and a closing aid according to the first aspect. Here, the connecting element of the closing aid may be arranged on or in the rear wall and/or may be arranged on or in the at least one side wall. The connecting element may be guided in any desired manner between actuating element and movement element. There is normally sufficient space outside the side walls and the rear wall of a luggage compartment to accommodate the relatively thin connecting element (for example, Bowden cable or hydraulic line).

In one implementation variant, the luggage compartment may furthermore comprise a base, a service channel for accommodating a service unit, and at least one holder for the connecting element on the base in the region of the service channel. The service unit is normally provided for serving passengers seated beneath the luggage compartment. For example, fresh-air nozzles, reading lamps, call buttons and the like may be accommodated in the service unit. The connecting element of the closing aid is arranged on or in the base and is held and guided by the at least one holder in the region of the service channel. It is thus ensured that the service channel and the service unit are not impaired by the connecting element.

According to a yet further aspect for improved understanding of the present disclosure, a vehicle may comprise at least one closing aid according to the first aspect and/or at least one luggage compartment according to the further (second) aspect.

Furthermore, the above-described aspects, implementation variants and examples may self-evidently be combined, without this being explicitly described. Each of the described configuration variants is thus to be regarded as optional with regard to each of the aspects, configurations and variants or even combinations thereof. The present disclosure is consequently not limited to the individual configurations and configuration variants in the sequence described, or to a particular combination of the aspects and configuration variants.

BRIEF DESCRIPTION OF THE DRAWINGS

Preferred exemplary embodiments of the invention will now be explained in more detail with reference to the appended schematic drawings, in which.

DETAILED DESCRIPTION OF THE PREFERRED EMBODIMENTS

Figure 1:
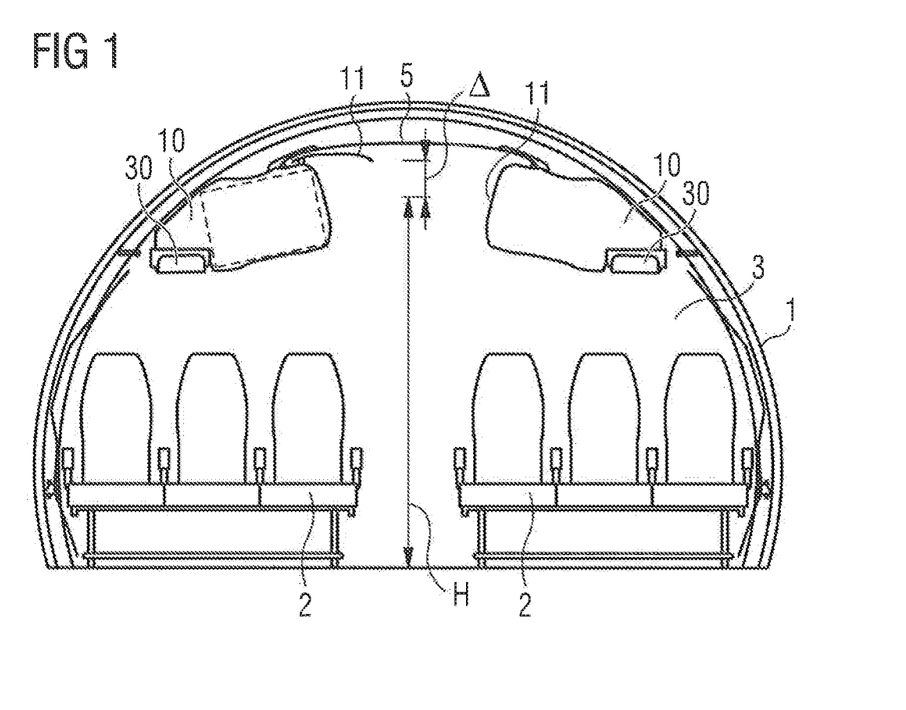
FIG. 1 schematically shows a vehicle region in the form of a sectional view of a vehicle.

FIG. 1 shows the arrangement of two luggage compartments 10 in a vehicle region 3. Luggage compartments 10 are normally arranged above rows of seats 2 in a vehicle 1, wherein persons can stand in an aisle between the rows of seats 2. If the luggage compartment flap 11 is now moved into its open position, as shown on the left in FIG. 1, the free end of the luggage compartment flap 11 may be situated so high up, for example a short distance below a ceiling panel 5, that it can no longer be reached by a standing person. A closing aid 100 (FIG. 2) now allows a movement of the luggage compartment flap 11 at least part of the way from its open position in the direction of its closed position, such that the free end of the luggage compartment flap 11 is moved downwards a particular extent A. As a result, the luggage compartment flap 11 is situated at a height H, at which it can normally be reached by a person with an outstretched hand. The height H may lie between 1.60 m and 1.90 m, preferably between 1.70 m and 1.80 m.

Figure 2:
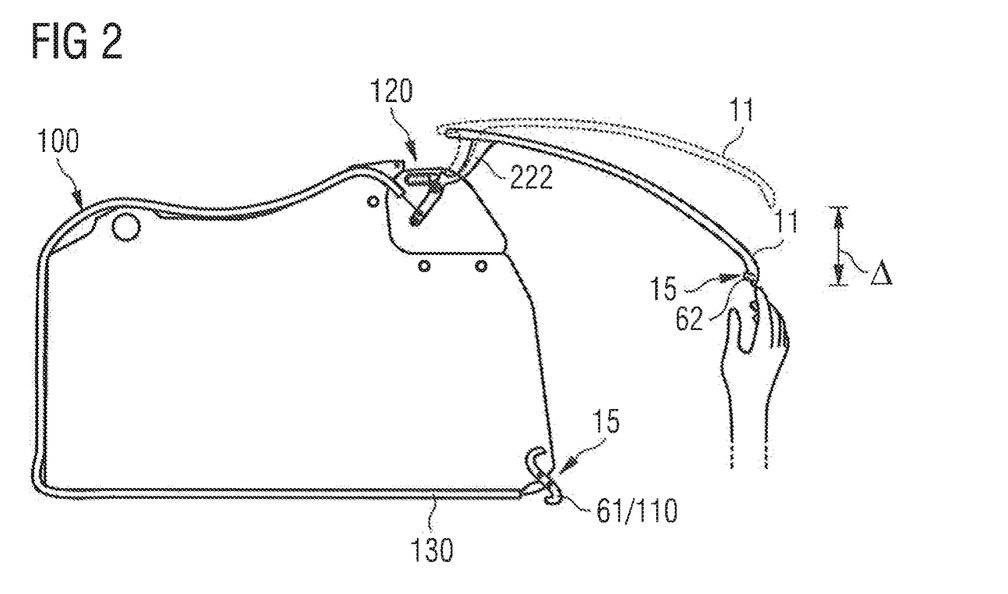
FIG. 2 shows a schematic lateral sectional view of a luggage compartment.

The closing aid 100 comprises an actuating element 110, a movement element 120 and a connecting element 130. In FIG. 2, the connecting element 130 is illustrated as a Bowden cable 130. The movement element 120, in this case an end of the Bowden cable 130, is indirectly coupled to the luggage compartment flap 11 in order to move the latter. The indirect coupling is realized here in the form of a connection of the end of the Bowden cable 130 to a mounting arm 222 on which the luggage compartment flap 11 is mounted.

The actuating element 110 of the closing aid 100 is illustrated by way of example in FIG. 2 as a movable catch 61 on the luggage compartment. The catch 61 is part of a locking mechanism 15 of the luggage compartment flap 11, wherein a closing element 62 associated with the catch 61 is provided on the luggage compartment flap 11. Different embodiments of the locking mechanism 15 will be discussed in more detail with reference to FIGS. 4 and 5. The actuating element 110 is thus integrated in the locking mechanism 15 and allows a movement of the movement element 120, whereby the luggage compartment flap 11 is moved at least part of the way from its open position (illustrated by dashed lines in FIG. 2) to its closed position (illustrated by solid lines in FIG. 2). Here, the free end of the luggage compartment flap 11 is moved downwards to the extent A, such that it can be more easily reached and gripped by a standing person in order to manually close the luggage compartment flap 11.

Figure 3:
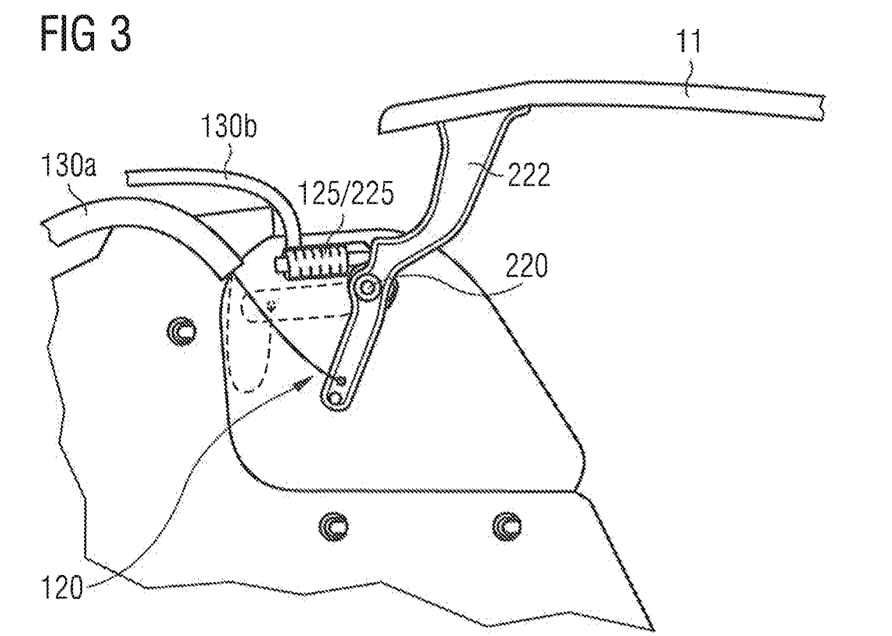
FIG. 3 schematically shows a detail from FIG. 2 with movement element.

FIG. 3 schematically shows the movement element 120 from FIG. 2 in detail, wherein optional or alternative variants of the movement element 120 are illustrated together in FIG. 3. The luggage compartment flap 11 is fastened to a first section of a mounting arm 222, which is mounted rotatably at an articulation point 220. The luggage compartment flap 11 can be moved at least part of the way from its open position in the direction of its closed position about the articulation point 220.

In a first option of the movement element 120, a Bowden cable 130a is provided as connecting element 130. An end of the Bowden cable 130a is fastened to a second section of the mounting arm 222, which is situated opposite the first section relative to the articulation point 220. If the Bowden cable 130a (in particular, the wire cable thereof) is now actuated, this is pulled upwards to the left in FIG. 3. As a result of this pulling movement, the mounting arm 222 is rotated clockwise (in FIG. 3) about the articulation point 220, whereby the luggage compartment flap 11 is likewise rotated and the free end of the luggage compartment flap is moved downwards to the extent A (see FIG. 2).

Here, the length of the Bowden cable 130a is selected such that the Bowden cable 130a is tensioned when the luggage compartment flap 11 is situated in its open position.

FIG. 3 illustrates, by dashed lines, at least the second section of the mounting arm 222 in a position which corresponds to the mounting arm 222 in the closed position of the luggage compartment flap 11. Here, the Bowden cable 130a forms a loop (likewise illustrated by dashed lines). Even if the Bowden cable 130a were now actuated, the luggage compartment flap 11 would not move.

An alternative variant of the closing aid 100, in particular, of the connecting element 130 and of the movement element 120, is likewise illustrated in FIG. 3. Accordingly, the connecting element 130 may be designed as a hydraulic line 130b. A movement element 120 in the form of a hydraulic actuator 125 is connected to the hydraulic line 130b. If hydraulic fluid is now forced via the hydraulic line 130b into the hydraulic actuator 125, this moves to the right in FIG. 3, whereby the mounting arm 222 is rotated clockwise (in FIG. 3) about the articulation point 220. Here, too, the luggage compartment flap 11 is rotated, and the free end of the luggage compartment flap 11 is moved downwards to the extent A (see FIG. 2).

In this variant, too, the movement element 120 can move the luggage compartment flap 11 only when the mounting arm 222 lies against the hydraulic actuator 125. As can be seen in FIG. 3, this is the case only when the luggage compartment flap 11 moves into its open position. By contrast, when the luggage compartment flap is in its closed position, the mounting arm 222 moves away from the hydraulic actuator 125.

In an optional variant, the hydraulic actuator 125 may be integrated into a hydraulic damping element 225. The hydraulic damping element 225 is activated whenever the luggage compartment flap 11 is moved from its closed position into its open position. During this movement, the mounting arm 222 will make contact with the hydraulic damping element 225, which then slows (dampens) the opening movement of the luggage compartment flap 11.

The hydraulic damping element 225 may, for example, comprise a piston, which can also be moved by hydraulic fluid from the hydraulic line 130b. Thus, after performing its damping function, the hydraulic damping element 225 can also be used as movement element 120.

Irrespective of the variant of the closing aid 100, the movement of the luggage compartment flap 11 may be effected, for example, by a spiral spring or a similar spring element (not illustrated). For example, a spiral spring (not illustrated) may be provided at the articulation point 220 and be operatively connected to the mounting arm 222. If the luggage compartment flap 11 is now unlocked, the spiral spring can move the luggage compartment flap 11 into the open position.

Figure 4:
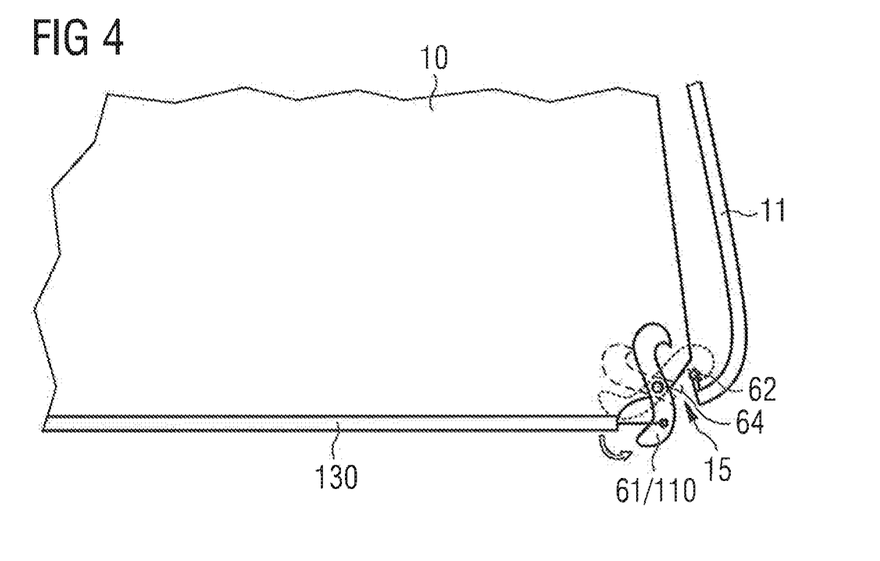
FIG. 4 schematically shows a detail from FIG. 2 with actuating element.

The unlocking of the luggage compartment flap 11 will now be discussed in more detail on the basis of two variants according to FIGS. 4 and 5. In FIG. 4, the locking mechanism 15 of the luggage compartment flap 11 is composed at least of a movable catch 61 on the luggage compartment and of a closing element 62 on the luggage compartment flap. As can be seen from the position of the upper section of the catch 61 illustrated by dashed lines on the right in FIG. 4, the catch 61 is in operative connection with the closing element 62, for example by engaging around or engaging behind the closing element 62. If a pulling action is now exerted on the lower end of the catch 61, the catch 61 can rotate counterclockwise (in FIG. 4) about an articulation point 64, whereby the closing element 62 is released. The luggage compartment flap 11 can then be opened manually or automatically (for example, by means of a spiral spring).

During the movement of the catch 61 in the opening direction from the locking position (right-hand position in FIG. 4, shown by dashed lines), in which the closing element 62 is held, the Bowden cable 130a which is also illustrated by way of example in FIG. 4 is moved and pretensioned. For example, the loop, illustrated in FIG. 3 by dashed lines, of the Bowden cable 130a can also be shortened. If a further movement of the catch 61 in the opening direction is now performed, the Bowden cable 130a is pulled. Here, the luggage compartment flap 11 moves at least part of the way from its open position in the direction of the closed position. The associated position of the catch 61 (at least of the upper section thereof) is likewise illustrated by dashed lines in FIG. 4. The actuating element 110 is thus integrated in the catch 61 and also in the Bowden cable 130a connected thereto.

If the connecting element is implemented by means of a hydraulic line 130b instead of a Bowden cable 130a, a pressure piston as actuating element 110 can be attached to that section of the catch 61 which is situated above the articulation point 64. The rest of the function of the catch corresponds to the above-described variant with Bowden cable 130a.

Figure 5:
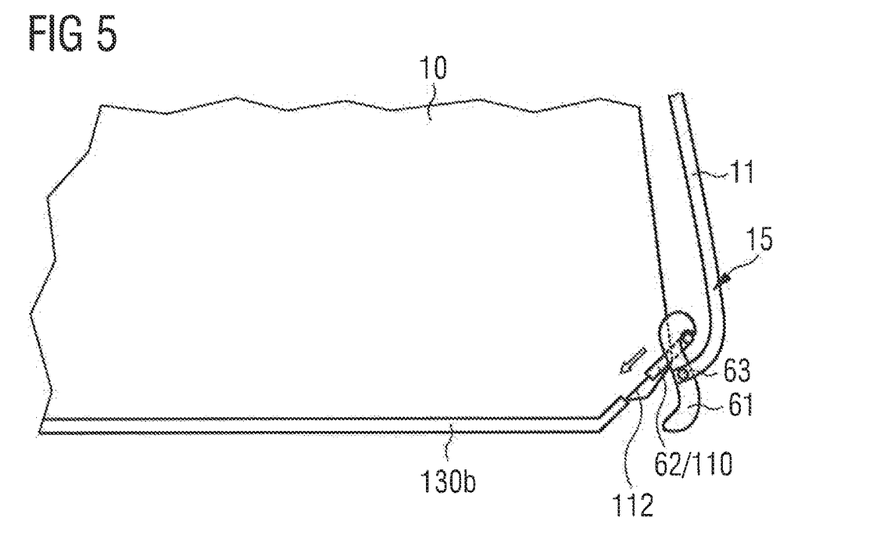
FIG. 5 schematically shows a detail from FIG. 2 with alternative actuating element.

A further variant is illustrated in FIG. 5, in which the locking mechanism 15 of the luggage compartment flap 11 has a closing element 62 on the luggage compartment and a catch 61 arranged on the luggage compartment flap. The closing element 62 can be engaged around or engaged behind by the catch 61, whereby the luggage compartment flap 11 is held and locked in its closed position illustrated in FIG. 5. By counterclockwise rotation of the catch 61 about an articulation point 63 on the luggage compartment flap 11, the catch 61 can be moved out of the closing element 62, whereby the luggage compartment flap 11 is freed and can be manually or automatically opened. The catch 61 may self-evidently also be arranged in a mirror-inverted manner, such that it is rotated clockwise about the articulation point 63 and releases the closing element 62.

The closing element 62, which is now no longer in use and which is blocked in a holding direction (to the right or upwards and to the right in FIG. 5), can now be moved in the opposite direction. As a result of this movement, it is, for example, possible for a pressure piston 112 as hydraulic element to force hydraulic fluid into the hydraulic line 130b, whereby a corresponding hydraulic movement element 120 is actuated and the luggage compartment flap 11 is moved from its open position into its closed position. Here, too, the actuating element 110 is integrated into the locking mechanism 15 of the luggage compartment flap 11. The pressure piston 112 may self-evidently also be arranged in a position other than that illustrated in FIG. 5, for example parallel to the base of the luggage compartment 10.

The variant illustrated in FIG. 5 is also possible with a Bowden cable 130a. For this purpose, it would merely be necessary for a diverting roller to be provided, around which the Bowden cable 130a (in particular, the wire cable) is routed and which converts the movement of the closing element 62 towards the Bowden cable 130a into a reversed movement direction.

Figure 6A:
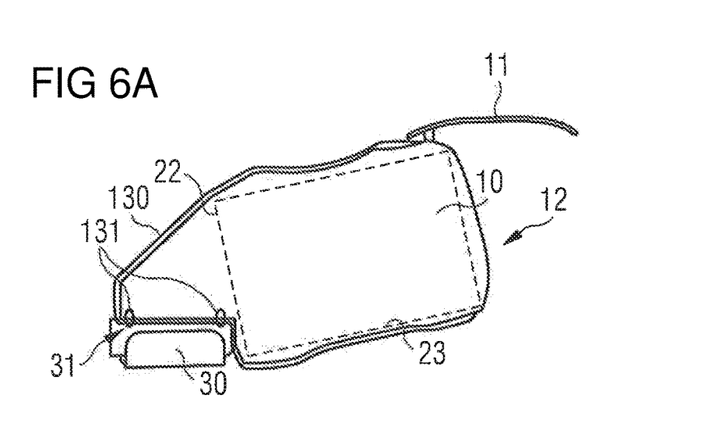
FIG. 6A shows a schematic lateral sectional view and FIG. 6B shows a front view of a luggage compartment.
Figure 6B:
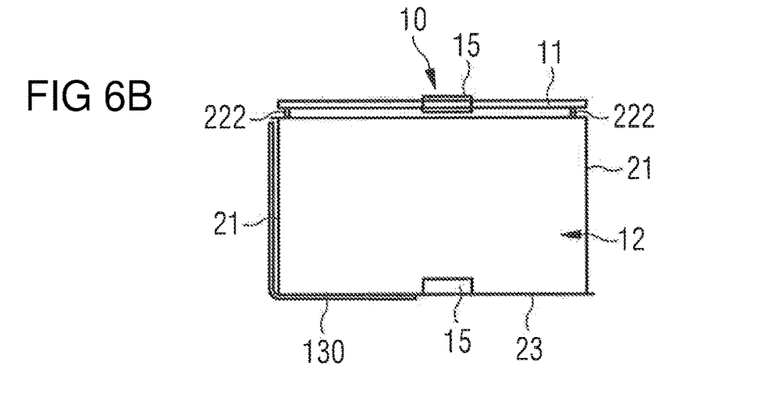

FIGS. 2, 6A and 6B illustrate the course of the connecting element 130 in more detail. In order to retrofit the closing aid 100, for example in existing luggage compartments 10, it is easiest for the connecting element 130 to be routed along an outer side of the luggage compartment 10. Since there is normally sufficient space in this region for a Bowden cable 130a or a hydraulic line 130b, the connecting element 130 can be routed virtually freely. It is however often the case on luggage compartments 10 that a service unit 30 is provided in an associated service channel 31. So as not to restrict the functionality of the service channel 31 and thus of the service unit 30 here, holders 131 may be provided in the region of the service channel 31, in which holders the connecting element 130 is held and/or guided. Instead of routing the connecting element 130 along the rear wall 22 of the luggage compartment 10, it is also possible for the connecting element 130 to be routed along a side wall 21 (on the right in FIG. 6).

The exemplary embodiments and variants described above serve merely for illustrating the invention. All examples, variants and individual details may be combined with one another as desired in order to form particular embodiments of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A closing aid for a luggage compartment flap of a luggage compartment, wherein the luggage compartment flap is pivotable relative to a static section of the luggage compartment, and wherein the closing aid comprises:
   an actuating element configured to be moved from an initial position into an activation position;
   a movement element configured to be fastened to the luggage compartment flap; and
   a connecting element which connects the actuating element to the movement element and which transmits a movement of the actuating element to the movement element,
   wherein the luggage compartment flap is moved at least part of the way from an open position to a closed position as a result of the movement of the movement element, and
   wherein the actuating element is integrated in a locking mechanism of the luggage compartment flap.

2. The closing aid according to claim 1,
   wherein the locking mechanism is a movable catch on the luggage compartment, and
   wherein the catch is movable in an opening direction from a locking position in which the catch holds a closing element into a position in which the catch releases the closing element, and said catch is furthermore configured to, in a further movement which takes place in the opening direction, move the movement element.

3. The closing aid according to claim 1, wherein the locking mechanism is a closing element on the luggage compartment, which closing element is blocked in a holding direction, in which the closing element firmly holds a catch, and is movable in an opposite direction.

4. The closing aid according to claim 1, wherein the connecting element is a Bowden cable.

5. The closing aid according to claim 4,
wherein the movement element is an end, fastened to the luggage compartment flap, of the Bowden cable, and
wherein the Bowden cable has a length which allows a movement of the luggage compartment flap from the closed position to the open position before the Bowden cable is tensioned.

6. The closing aid according to claim 1, wherein the connecting element is a hydraulic line.

7. The closing aid according to claim 6,
wherein the movement element is a hydraulic actuator, and
wherein the hydraulic actuator is a hydraulic damping element which dampens an opening movement of the luggage compartment flap.

8. A luggage compartment for a vehicle, comprising:
at least one side wall;
a rear wall; and
a closing aid according to claim 1,
wherein the connecting element of the closing aid is arranged on or in at least one of the rear wall or the at least one side wall.

9. The luggage compartment according to claim 8, furthermore comprising:
a base;
a service channel to accommodate a service unit; and
at least one holder for the connecting element on the base in a region of the service channel,
wherein the connecting element of the closing aid is arranged on or in the base and is held and guided by the at least one holder in the region of the service channel.

10. A vehicle having at least one closing aid according claim 1.

11. A vehicle having at least one luggage compartment according to claim 8.

* * * * *